US007761584B2

(12) United States Patent
Langworthy et al.

(10) Patent No.: US 7,761,584 B2
(45) Date of Patent: Jul. 20, 2010

(54) GENERALIZED PROTOCOL MAPPING

(75) Inventors: David E. Langworthy, Kirkland, WA (US); Satish R. Thatte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1294 days.

(21) Appl. No.: 10/956,849

(22) Filed: Oct. 1, 2004

(65) Prior Publication Data

US 2006/0085560 A1 Apr. 20, 2006

(51) Int. Cl.
*G06F 15/16* (2006.01)

(52) U.S. Cl. ....................................... 709/230; 709/246

(58) Field of Classification Search ................. 709/230, 709/246, 250
See application file for complete search history.

(56) References Cited

U.S. PATENT DOCUMENTS 6,222,855 B1 * 4/2001 Kimber et al. .............. 370/466
6,611,817 B1 * 8/2003 Dorrance et al. .............. 705/39
6,766,375 B2 * 7/2004 Hadland ..................... 709/230
7,222,302 B2 * 5/2007 Hauser et al. ............... 715/734
7,376,959 B2 * 5/2008 Warshaysky et al. ........ 719/330
2003/0074215 A1 * 4/2003 Morciniec et al. .............. 705/1
2003/0204645 A1 * 10/2003 Sharma et al. .............. 709/328
2004/0003033 A1 * 1/2004 Kamen et al. ............... 709/203
2004/0006653 A1 * 1/2004 Kamen et al. ............... 709/330
2004/0015564 A1 * 1/2004 Williams .................... 709/219
2004/0255046 A1 * 12/2004 Ringseth et al. ............. 709/246
2006/0026552 A1 * 2/2006 Mazzitelli et al. ........... 717/101

* cited by examiner

*Primary Examiner*—Yemane Mesfin
(74) *Attorney, Agent, or Firm*—Woodcock Washburn LLP

(57) ABSTRACT

Signals are mapped from one protocol to another protocol. A first protocol is received, and a mapping interface is generated to a second protocol. The first protocol is then mapped to the second protocol in accordance with the mapping interface. The mapping interface may comprise a coordination map. Moreover, a state diagram may be generated that is based on the first protocol, prior to mapping the first protocol to the second protocol. The first protocol may be an abstract protocol or a web services business activity protocol, for example, and the second protocol may be another abstract protocol, a concrete interface, a web services interface, a common language runtime interface, or a business process execution language for web services, for example.

26 Claims, 10 Drawing Sheets

```
<portType name="BuyerPT">
  <operation name="ReadyToShip">
    <input message="RTS"/>
  </operation>
  <operation name="OrderDeclined">
    <input message="OD"/>
  </operation>
  <operation name="OutOfStock">
    <input message="OOS"/>
  </operation>
  <operation name="RevokeFailed">
    <input message="RF"/>
  </operation>
  <operation name="OrderCanclled">
    <input message="OC"/>
  </operation>
  <operation name="ShipConfirmation">
    <input message="SC"/>
  </operation>
  <operation name="RevokeSuccessful">
    <input message="RS"/>
  </operation>
</portType>
<portType name="SellNormalPT">
  <operation name="ConfirmAndShipOrder">
    <input message="CASO"/>
  </operation>
</portType>
<portType name="SellBreakPT">
  <operation name="CancelOrder">
    <input message="CO"/>
  </operation>
  <operation name="RevokeOrder">
    <input message="RO"/>
  </operation>
</portType>
```

Fig. 6

```
<serviceLinkType name="BuyerSellerLink">
    <role name="Buyer">
  <portType name="b:BuyerPT"/>
 </role>
 <role name="Seller">
  <portType name="s:SellerPT"/>
 </role>
 <BPEL:coordinationMap participant="Seller" coordinator="Buyer">
  <BPEL:completed operation="ReadyToShip" portType="b:BuyerPT"/>
  <BPEL:cancel operation="CancelOrder" portType="s:SellBreakPT"/>
  <BPEL:compensate operation="ReturnToInventory" portType="s:SellBreakPT" />
  <BPEL:close operation="ConfirmAndShipOrder" portType="s:SellNormalPT"/>
  ....
 </BPEL:coordinationMap>
</serviceLinkType>
```

Fig. 7

```
<protocolMapType name="BuyerSellerCoordinationType"            pattern="BPWS:BA_Coordination" ..>
  <role name="BuyerCo" type="coordinator">
    <portType name="buy:BuyerPortType"/>
  </role>
  <role name="SellerCo" type="participant">
    <portType name="sell:SellerPortType"/>
  </role>
  <operationMap>
    <map protocolOperation="completed"  serviceOperation="ReadyToShip"  servicePortType="buy:BuyerPT"/>
    <map protocolOperation="cancel"     serviceOperation="CancelOrder" servicePortType="sell:SellerPT"/>
    <map protocolOperation="compensate" serviceOperation="ReverseOrder"  servicePortType="sell:SellerPT"/>
    <map protocolOperation="close" serviceOperation="ConfirmAndShipOrder" servicePortType="sell:SellerPT"/>
    <map protocolOperation="fault"      serviceOperation="OutOfStock"  servicePortType="buy:BuyerPT"/>
  </operationMap>
</protocolMapType>
```

Fig. 8

```
[CallPattern("Foo ( Foo | Bar )")]
        public class FooBar2 : ContextBoundObject
        {
                public void Foo() {}
                public void Bar() {}
        }
```

Fig. 9

```
[CallPattern("FooBar.contract")]
public class FooBar : ContextBoundObject
{
        public void Foo() {}
        public void Bar() {}
}
```

Contents of the FooBar.contract file:

```
<p:PatternSet Name="FooBar" xmlns:p="http://schemas.xmlsoap.org/ws/2003/xx/Pattern">
  <p:Message Name="Foo" Direction="In">
        <p:Message Name="Bar" Direction="In"/>
  </p:Message>
</p:PatternSet>
```

Fig. 10

```
<protocolMapType name="BuyerSellerCoordinationType"
          pattern="BPWS:BA_Coordination" ..>

  <role name="BuyerCo" type="coordinator">
     <portType name="buy:BuyerPortType"/>
   </role>

  <operationMap>
    <!-- mapping protocol operations to web service operations -->
    <map protocolOperation="completed"
        serviceOperation="ReadyToShip"
        servicePortType="buy:BuyerPT"/>
    <map protocolOperation="fault"
        serviceOperation="OutOfStock"
        servicePortType="buy:BuyerPT"/>
       ....
  </operationMap>
</protocolMapType>
```

Fig. 11

GENERALIZED PROTOCOL MAPPING

FIELD OF THE INVENTION

The present invention relates generally to the field of software development for distributed systems, and, more particularly, to the relationship between patterns of interaction and messages transmitted over a network.

BACKGROUND OF THE INVENTION

Web services (sometimes called application services) are services that are made available from a business's web server for web users or other web-connected programs. Providers of web services are generally known as application service providers. Web services range from such major services as storage management and customer relationship management (CRM) down to much more limited services such as the furnishing of a stock quote and the checking of bids for an auction item. The accelerating creation and availability of these services is a major web trend. Users can access some web services through a peer-to-peer arrangement rather than by going to a central server. Some services can communicate with other services and this exchange of procedures and data is generally enabled by a class of software known as middleware. Services previously possible only with the older standardized service known as Electronic Data Interchange (EDI) increasingly are likely to become web services. Besides the standardization and wide availability to users and businesses of the internet itself, web services are also increasingly enabled by the use of the Extensible Markup Language (XML) as a means of standardizing data formats and exchanging data. XML is the foundation for the Web Services Description Language (WSDL).

When developers write web services they must move beyond designing interfaces for local objects. They essentially design protocols for interacting with remote services. Today, this is done in an ad hoc and often incorrect manner.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The present invention is directed to mapping the signals from one protocol to another protocol.

Exemplary embodiments include systems and methods of protocol mapping. A first protocol is received, and a mapping interface is generated to a second protocol. The first protocol is then mapped to the second protocol in accordance with the mapping interface. The mapping interface may comprise a coordination map. Moreover, a state diagram may be generated that is based on the first protocol, prior to mapping the first protocol to the second protocol.

According to aspects of the invention, the first protocol may be an abstract protocol or a web services business activity protocol, for example, and the second protocol may be another abstract protocol, a concrete interface, a web services interface, a common language runtime interface, or a business process execution language for web services, for example.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 is an exemplary WSDL description of exemplary ports, operations, and messages for a buyer and seller in accordance with the present invention;

FIG. 7 is code representing an exemplary mapping in accordance with the present invention;

FIG. 8 is code representing another exemplary mapping in accordance with the present invention;

FIG. 9 is code representing another exemplary mapping in accordance with the present invention;

FIG. 10 is code representing another exemplary mapping in accordance with the present invention;

FIG. 11 is code representing another exemplary mapping in accordance with the present invention.

DETAILED DESCRIPTION OF PREFERRED EMBODIMENTS

Figure 1:
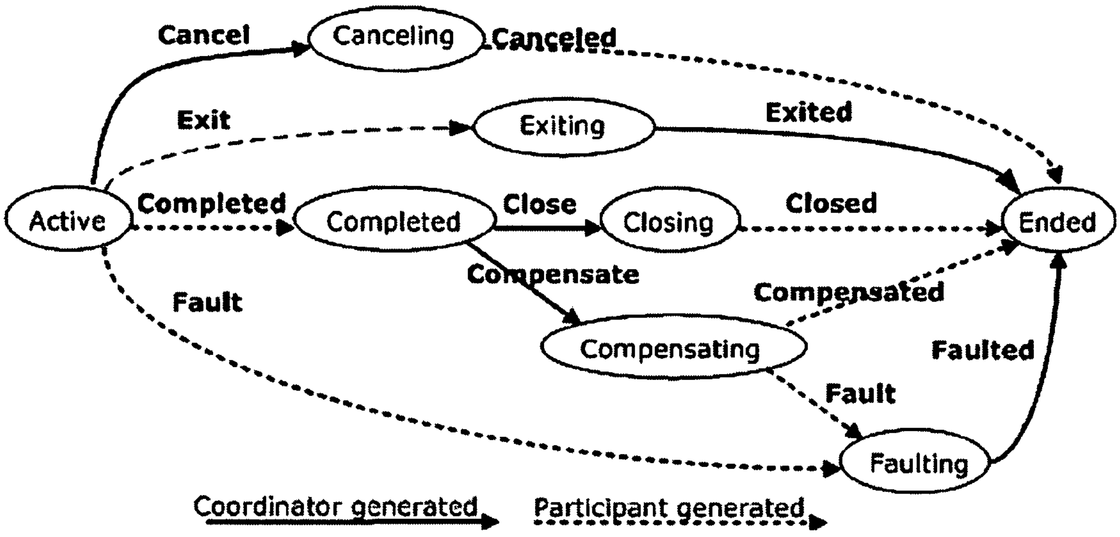
FIG. 1 is a state diagram of an exemplary protocol in accordance with the present invention.

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Web Services Business Activity (WS-BA) Framework

The present invention may be used in the web services business activity (WS-BusinessActivity or WS-BA) framework. By using the SOAP (Simple Object Access Protocol) and WSDL (Web Services Description Language) extensibility model, SOAP-based and WSDL-based specifications are designed to work together to define a rich web services environment.

The current set of web service specifications such as WSDL and SOAP defines protocols for web service interoperability. Web services increasingly tie together a number of participants forming large distributed applications. The resulting activities may have complex structure and relationships.

The WS-BA specification provides the definition of a business activity coordination type used to coordinate activities that apply business logic to handle business exceptions. Actions desirably are applied immediately and are permanent. Compensating actions may be invoked in the event of an error. The WS-BA specification defines protocols that enable existing business process and work flow systems to wrap their proprietary mechanisms and interoperate across trust boundaries and different vendor implementations.

The web services business specification is used to describe how to reliably define, create, and connect multiple business processes in a web services environment, and help organizations coordinate business processes and transactions within the enterprise and with partners and customers across heterogeneous systems and within the enterprise. A language to describe business processes is Business Process Execution Language for Web Services, or BPEL4WS. BPEL4WS is an XML-based flow language that defines how business processes interact. This interaction can involve processes contained within or between enterprises. It allows companies to describe complex business processes that can span multiple companies, such as order processing, lead management, and claims handling. These business processes can use partner-provided web services, and can also be offered as web services business process functions internally or to partners in a reliable and dependable way.

A business process describes the flow of tasks, the order in which they need to be performed, the type of data shared, and how other partners are involved. BPEL4WS allows companies to describe business processes that include multiple web services and standardize message exchange internally and between partners. WS-Coordination and WS-Transaction provide companies with a reliable and durable way of handling multiple web services interactions, regardless of the underlying computing infrastructure. In addition, they outline how partners can interact with a collection of web services and coordinate the outcome of those corresponding activities.

Thus, exemplary coordination protocols for business activities are BusinessAgreementWithParticipantCompletion and BusinessAgreementWithCoordinatorCompletion. Regarding BusinessAgreementWithParticipantCompletion, a participant registers for this protocol with its coordinator, so that its coordinator can manage it. A participant must know when it has completed all work for a business activity. Similarly, with respect to BusinessAgreementWithCoordinatorCompletion, a participant registers for this protocol with its coordinator, so that its coordinator can manage it. A participant relies on its coordinator to tell it when it has received all requests to perform work within the business activity.

FIG. 1 is an exemplary state diagram that specifies the behavior of a protocol between a coordinator and a participant. The exemplary protocol is the BusinessAgreementWithParticipantCompletion protocol. Participants register for this protocol using a protocol identifier. The agreement coordination state reflects what each participant knows of its relationship at a given point in time. As messages take time to be delivered, the views of the coordinator and a participant may temporarily differ. Omitted are details such as resending of messages or the exchange of error messages due to protocol error.

The coordinator accepts several messages or notifications. Upon receipt of the "completed" notification, the coordinator knows that the participant has completed all processing related to the protocol instance. For the next protocol message, the coordinator should send a "close" or "compensate" notification to indicate the final outcome of the protocol instance.

Upon receipt of the "fault" notification, the coordinator knows that the participant has failed from the active or compensating state. For the next protocol message, the coordinator should send a "faulted" notification. This notification desirably carries a QName defined in schema indicating the cause of the fault.

Upon receipt of the "compensated" notification, the coordinator knows that the participant has recorded a compensation request for a protocol. Upon receipt of the "closed" notification, the coordinator knows that the participant has finalized successfully.

Upon receipt of the "canceled" notification, the coordinator knows that the participant has finalized successfully processing the "cancel" notification. Upon receipt of the "exit" notification, the coordinator knows that the participant will no longer participate in the business activity. For the next protocol message, the coordinator should send an "exited" notification.

The participant also accepts several messages or notifications. Upon receipt of the "close" notification, the participant knows the protocol instance is to complete successfully. For the next protocol message, the participant should send a "closed" notification to end the protocol instance.

Upon receipt of the "cancel" notification, the participant knows that the work being done has to be canceled. For the next protocol message, the participant should send a "canceled" notification to end the protocol instance.

Upon receipt of the "compensate" notification, the participant knows that the work being done should be compensated. For the next protocol message, the participant should send a "compensated" notification to end the protocol instance.

Upon receipt of the "faulted" notification, the participant knows that the coordinator is aware of a fault and no further actions are required of the participant. Upon receipt of the "exited" notification, the participant knows that the coordinator is aware the participant will no longer participate in the activity.

The coordinator can enter a condition in which it has sent a protocol message and it receives a protocol message from the participant that is consistent with the former state, not the current state. In such a case, it is the responsibility of the coordinator to revert to the prior state, accept the notification from the participant, and continue the protocol from that point. If the participant detects this condition, it discards the inconsistent protocol message from the coordinator.

Figure 2:
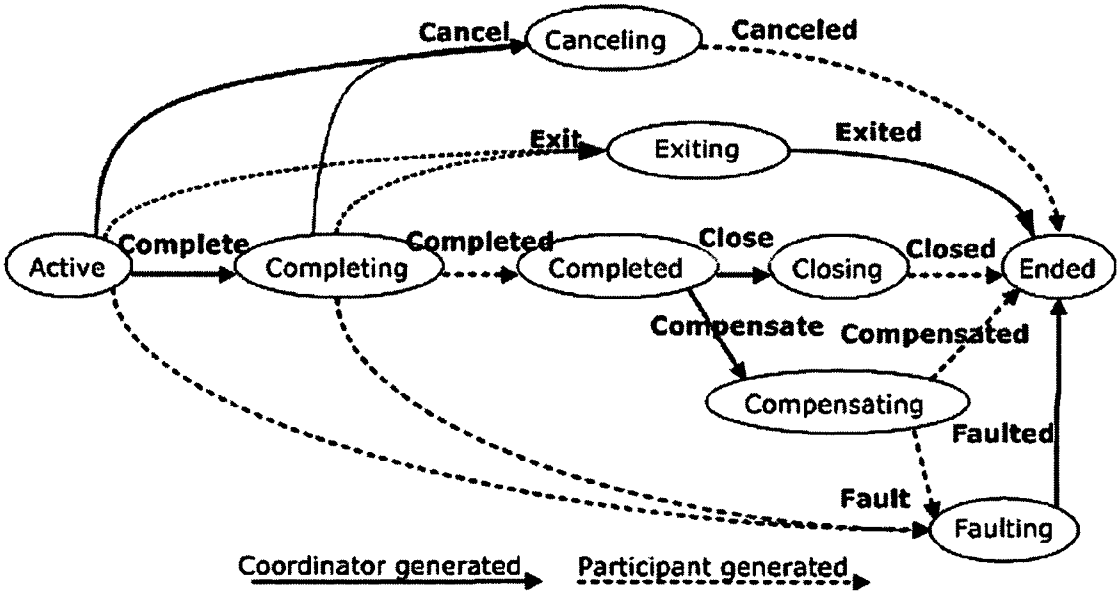
FIG. 2 is a state diagram of another exemplary protocol in accordance with the present invention.

FIG. 2 is an exemplary state diagram that specifies the behavior of another protocol between a coordinator and a participant. The exemplary protocol is the BusinessAgreementWithCoordinatorCompletion protocol. The BusinessAgreementWithCoordinatorCompletion protocol is the same as the BusinessAgreementWithParticipantCompletion protocol, except that a participant relies on its coordinator to tell it when it has received all requests to do work within the business activity.

In addition to the notifications set forth above with respect to FIG. 1, BusinessAgreementWithCoordinatorCompletion supports the participant accepting "complete". Upon receipt of this notification, the participant knows that it will receive no new requests for work within the business activity. It should complete application processing and transmit a "completed" notification.

As used herein, cancel means to back out of a business activity, and close means to terminate a business activity with a favorable outcome. Compensate is a message to a completed participant from a coordinator to execute its compensation. This message is part of both the BusinessAgreementWithParticipantCompletion and BusinessAgreementWithCoordinatorCompletion protocols.

Complete is a message to a participant from a coordinator telling it that it has been given all of the work for that business activity. This message is part of the BusinessAgreementWithCoordinatorCompletion protocol. Completed is a message from a participant telling a coordinator that the participant has successfully executed everything asked of it and needs to continue participating in the protocol. This message is part of both the BusinessAgreementWithParticipantCompletion and BusinessAgreementWithCoordinatorCompletion protocols.

Exit is a message from a participant telling a coordinator that the participant does not need to continue participating in the protocol. This message is part of both the BusinessAgreementWithParticipantCompletion and BusinessAgreementWithCoordinatorCompletion protocols. Fault is a message from a participant telling a coordinator that the participant could not execute successfully.

BusinessAgreementWithParticipantCompletion protocol is a business activity coordination protocol that supports long-lived business processes and allows business logic to handle business logic exceptions. A participant in this protocol must know when it has completed with its tasks in a business activity.

BusinessAgreementWithCoordinatorCompletion protocol is a business activity coordination protocol that supports long-lived business processes and allows business logic to handle business logic exceptions. A participant in this protocol relies on its coordinator to tell it when it has received all requests to do work within a business activity.

Scope is a business activity instance. A scope integrates coordinator and application logic. A web services application can be partitioned into a hierarchy of scopes, where the application understands the relationship between the parent scope and its child scopes.

Exemplary Embodiments

A protocol is a structured communication pattern. Examples range from bartering for goods in a public market to a reliable message exchange. For example, an abstract protocol is a pattern of behavior. An interface defines the structures and actions an object or service accepts. Aspects of the present invention are directed to mapping from a high-level protocol abstract description to a concrete interface or another protocol.

FIG. 1, as set forth above, shows a state diagram that represents an abstract protocol. It is abstract because it can be mapped onto various business models. For example, "cancel" in the abstract model can be mapped onto "cancel trade" or "cancel order" in the financial services. It is desirable to map the abstract protocol to something that will implement the abstract protocol (e.g., a concrete protocol in which the signals drive the transaction). It is also desirable to map an abstract protocol to an interaction between two web services.

In an exemplary abstract protocol, the two roles are participant and coordinator. The participant acts as the seller and the coordinator acts as the buyer. Desirably, the roles are mapped, and then the transitions and messages are mapped. For example, a buyer and seller each provide a port type to each other. Generally, to map from an arbitrary protocol to an arbitrary port type, the transitions are made into parameters. The new transitions are then mapped.

According to an exemplary embodiment, the abstract protocol is translated or otherwise encoded into a state diagram. The state diagram is a contract showing what gets mapped onto the concrete protocol. The state diagram is used to build a concrete protocol, for example.

Figure 3:
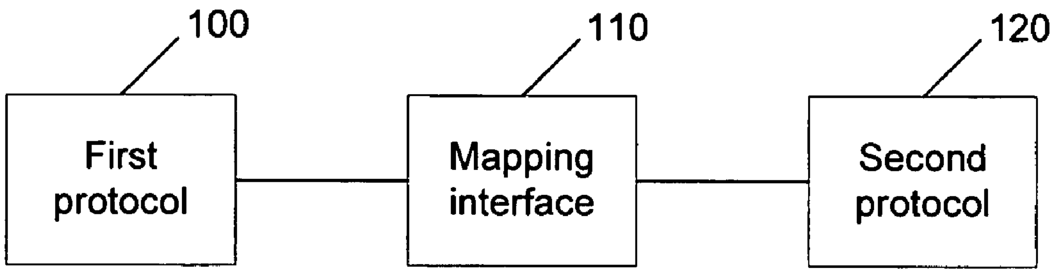
FIG. 3 is a block diagram of protocol mapping in accordance with the present invention.

FIG. 3 is a block diagram of protocol mapping in accordance with the present invention. A protocol 100, such as an abstract protocol, is mapped to another protocol 120, such as a concrete protocol. A mapping interface or coordination map 110 is generated and used to map the signals of the first protocol 100 to the operations of the second protocol 120.

Figure 4:
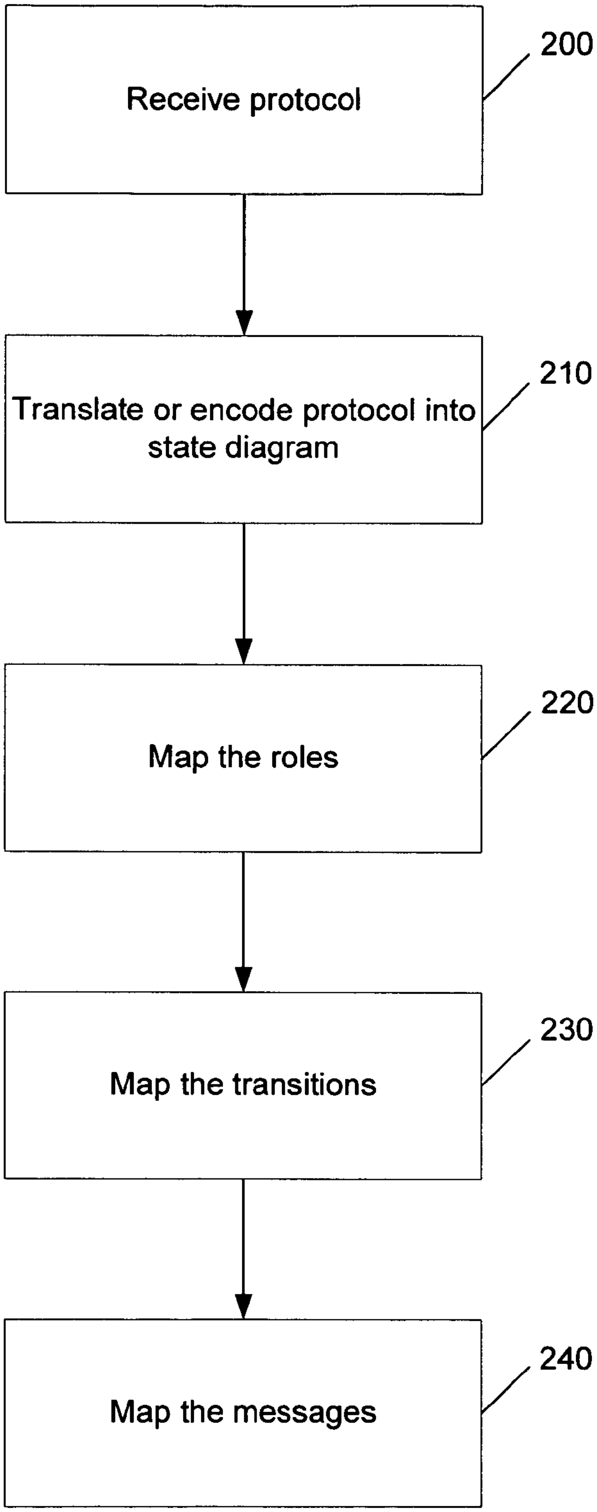
FIG. 4 is a flow diagram of an exemplary method of protocol mapping in accordance with the present invention.

FIG. 4 is a flow diagram of an exemplary method of protocol mapping in accordance with the present invention. Examples are set forth below. At step 200, an protocol, such as an abstract protocol, is received. The protocol is translated or encoded into a state diagram at step 210. The state diagram is then mapped to another protocol, via a coordination map for example, by mapping the roles at step 220 (e.g., mapping between an abstract role and a concrete role), mapping the transitions at step 230, and mapping the messages at step 240 (e.g., mapping between abstract signals and concrete operations). It is noted that the mapping can be performed in any order and is not limited to the order shown in FIG. 4.

Figure 5:
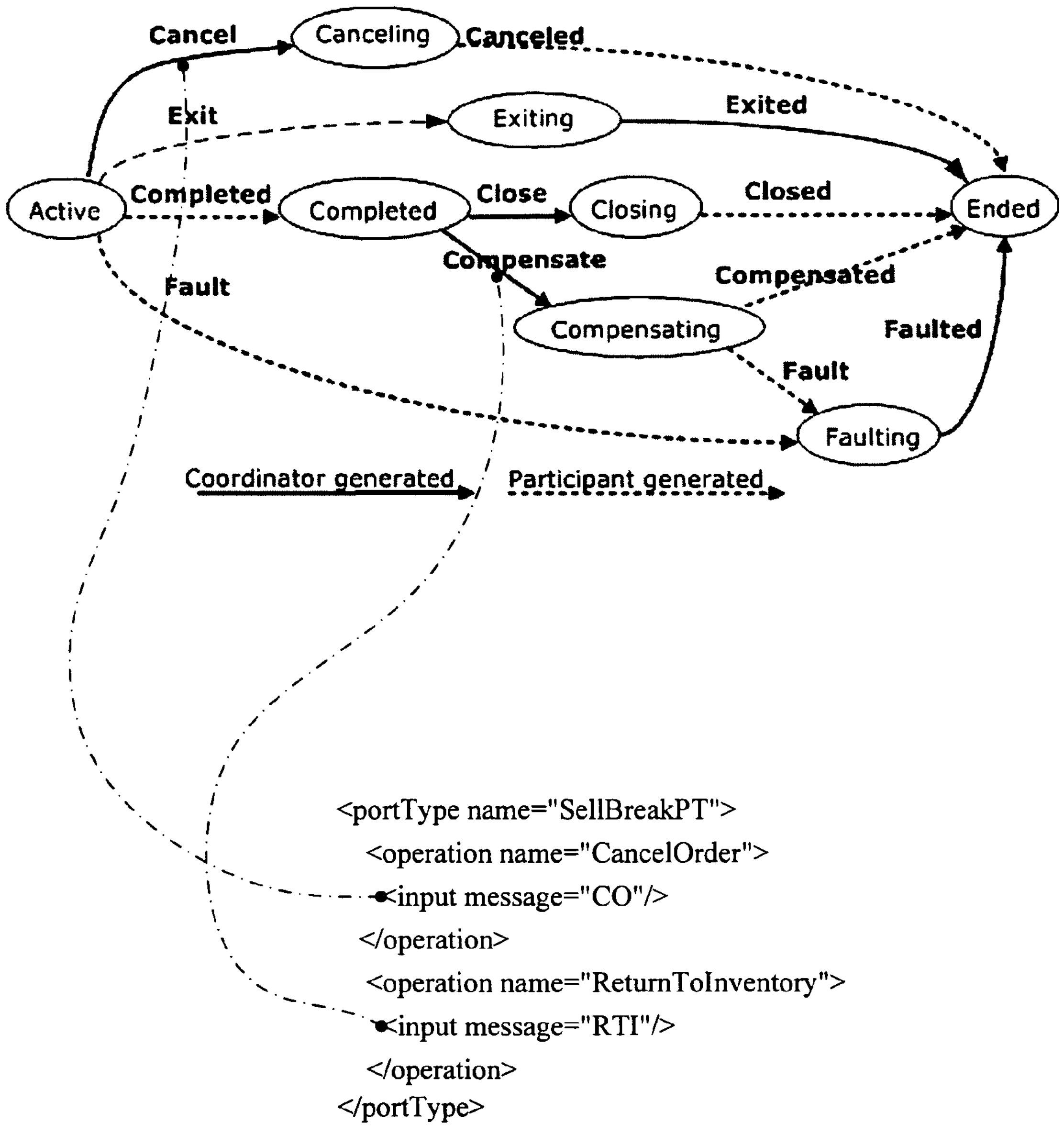
FIG. 5 is a diagram of an exemplary protocol mapping in accordance with the present invention.

FIG. 5 is a diagram of an exemplary protocol mapping in accordance with the present invention. Here, a state diagram of an exemplary protocol, such as that shown in FIG. 1, is mapped to transitions. For example, the "cancel" notification of FIG. 1 is mapped to the transition operation "Cancel Order", and the "compensate" notification is mapped to the transition operation "Return To Inventory". Exemplary transitions are shown in FIG. 6. Features of the present invention provide such mappings.

FIG. 6 is an exemplary WSDL description of exemplary ports, operations, and messages for a buyer and seller. An exemplary mapping is described with respect to FIG. 7, in which WS-BA is mapped onto BPEL. This example is directed to the coordination of business processes. As described further above, WS-BA defines a protocol for managing compensating transactions. It uses WSDL, XML Schema, and state tables to define the syntax and dynamics of the stand alone protocol. Alternatively, this signal mapping allows normal application messages to bind directly to transitions in the state table. This means that no extra messages are required.

For example, port type "BuyerPT" refers to transition operations such as "ready to ship", "order declined", "out of stock", "revoke failed", "order cancelled", and "revoke successful". Input messages corresponding to these transition operations are also provided. Port type "SellNormalPT" refers to transition operation "confirm and ship order, and port type "SellBreakPT" refers to "cancel order" and "revoke order".

In the coordination map shown in FIG. 7, the two named role elements refer to WSDL port types that define at least the operations mentioned by name here. The coordinationMap element maps the port types (seller, buyer) onto roles (participant, coordinator) defined in WS-BA. The signals element contains the signals defined in WS-BA (e.g., completed, cancel, compensate, close) and binds them to the operation (e.g., ready to ship, cancel order, return to inventory, confirm and ship order) in the concrete protocol.

More particularly, lines 1-15 in FIG. 7 contain a service interaction description in XML syntax. "serviceLinkType" in Lines 1 and 15 is an arbitrary name to define the intent and scope of the expression, in this case to define a service interaction. Line 1 contains a "name" attribute with a value of "BuyerSellerLink". This expression defines a name for this particular instance of a service description.

Lines 2-4 and 5-7 define the two service roles in the interaction the "Buyer" and the "Seller". Line 3 defines the WSDL port type for the buyer. A port type is a fixed set of web services operations which typically manifest as SOAP messages which enter (inputs) or exit (outputs) a service. Line 6 defines the port types for the seller. In this case, the seller service exposes two port types, "SellNormalPT" and "SellBreakPT".

Lines 8-15 comprise the coordination map which defines the mapping. This coordination map is specific to the WS-BusinessActivity coordination type. Subsequent examples demonstrate more general mappings. The transitions are mapped to messages. WS-BusinessActivity defines two abstract roles, "participant" and "coordinator", and a set of abstract signals including "completed", "cancel", "compensate", and "close".

Line 8 establishes one equivalence (mapping) between the abstract role "participant" and the concrete role "Seller" and a second equivalence between the abstract role "coordinator" and the concrete role "Buyer". Line 9 establishes an equivalence (or mapping) between the abstract signal "completed" and the concrete operation "ReadyToShip" on the "BuyerPT" port type (message between the two web services, for example). Lines 10-12 establish similar equivalences or mappings between abstract signals and concrete operations. In this example, the abstract signals including "completed", "cancel", "compensate", and "close" are fixed per XML.

A more general example is directed to arbitrary mapping, as shown in FIG. 8. This is generalized into the mapping from an arbitrary protocol on to an interface as follows. The top level element comprises the name of the map and the protocol being mapped. In this mapping, the signal in the protocol is mapped to the operation by the map element in the operationMap container (line 8). Each map element contains three attributes (line 9, for example). The protocolOperation attribute specifies a signal name defined in the protocol. The serviceOperation and servicePortType desirably uniquely identify an operation in the interface.

More particularly, line 1 of FIG. 8 contains a name to indicate the intent and scope of the XML expression, in this case "protocolMapType", and the name of this particular instance of a service interaction description, "BuyerSellerCoordinationType". In addition, Line 1 contains the name of a pattern defined in some "Pattern Language" or "Contract Language", referred to as an abstract protocol, "BA_Coordination". The abstract protocol has two roles and protocol operations (also known as actions, transitions, or signals).

In this example, the protocol operations include "completed", "cancel", "compensate", "close", and "fault". The roles are as before "coordinator" and "participant"; however, in this example, the roles are parameterized. The role parameters are instantiated on Lines 2 and 5. The "type" attribute establishes a correspondence between the abstract role and the concrete role defined in the "name" attribute.

Lines 9-13 define maps from protocol operations to concrete operations against service port types. Line 9 establishes a mapping from the protocol operation "completed" to the "ReadyToShip" operation on the "BuyerPT" port type. Lines 10-13 establish similar mappings between protocol operations to concrete operations. The abstract parameters for the protocol operations are variables and may be changed in this example, per XML Another example is shown in FIG. 9 and maps a protocol defined by a contract language onto an interface defined in C#. This mapping is accomplished by means of the CallPattern attribute attached to the class definition. This attribute takes one argument containing either the contract or a reference to a separate file containing the contract.

In the example of FIG. 9, the contract is defined inline to be Foo followed by either a Foo or a Bar. The strings in the contract definition bind directly to the local method names in the C# class definition. Although this is less general than the mapping defined above, it has an advantage that it requires less information from the developer. This mapping style would apply equally well to any CLR language.

Thus, in the example of FIG. 9, two methods, Foo and Bar, have been defined in the class definition FooBar2. FooBar2 has been attributed with a call pattern that defines the protocol and the mapping.

In the example of FIG. 10, the contract is specified by a filename. The contents of the file are also shown. The mapping between the protocol and the interface is on syntactic equality between the name attribute in the contract file and the local method name of the class to which the CallPattern attribute is attached.

In the examples of FIGS. 9 and 10, the mapping requires no renaming. The purpose of the mapping is to relate a signature in an imperative language with the transitions in a protocol defined in a contract language.

A further example is shown in FIG. 11 and is directed to partial mappings, in which the seller can define its mappings later (i.e., leave the seller information out to be filled in later). Thus, the seller can fill it out however it likes. Such a feature provides added flexibility.

When mapping from an abstract to a concrete protocol it is often useful to bind some operations and leave others unbound. This mapping effectively creates a new protocol that has some concrete and some abstract characteristics.

Consider FIG. 6. It binds the buyer and seller port types to a Business Activity protocol. An enterprise that purchases goods from a large number of suppliers might choose to create a specialized protocol that binds the buy side to its internal processes and leaves the sell side unbound. This allows each supplier to create customized bindings.

Exemplary Computing Environment

Figure 12:
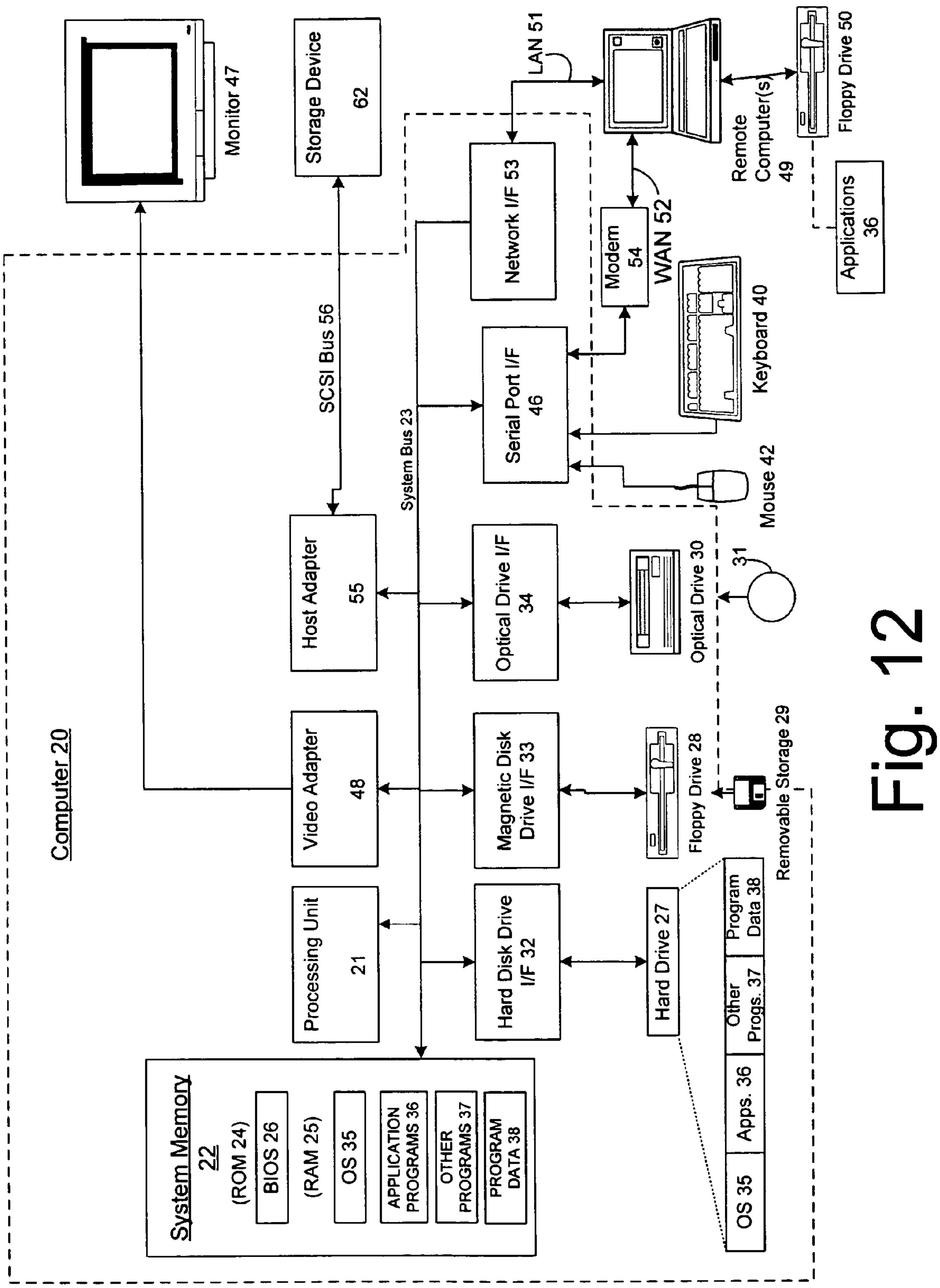
FIG. 12 is a block diagram representing a computer system in which aspects of the present invention may be incorporated.

Numerous embodiments of the present invention may execute on a computer. FIG. 12 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types.

Those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 12, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 12 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 12. The logical connections depicted in FIG. 12 include a local area network (LAN) 51 and a wide area network (WAN) 52. Such networking environments are commonplace in offices, enterprise wide computer networks, intranets and the internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed is:

1. A method, executed by a machine, of creating a new protocol from a first protocol, wherein a protocol is a structured communication pattern, comprising:

receiving the first protocol;

generating a mapping interface to a second protocol, wherein the mapping interface comprises a coordination map;

generating a state diagram based on the first protocol; and creating the new protocol by partially mapping the first protocol to the second protocol based on the mapping interface, wherein the first protocol is an abstract protocol defining abstract operations and the new protocol comprises a protocol having (a) concrete characteristics, which bind one or more of the abstract operations to a first concrete (executable) process, and (b) abstract characteristics, which permit subsequent customizable binding of one or more of the abstract operations to a plurality of other concrete processes.

2. The method of claim 1, wherein partially mapping the first protocol to the second protocol comprises mapping roles, transitions, and messages.

3. The method of claim 1, wherein the first protocol is a high-level protocol.

4. The method of claim 3, wherein the second protocol comprises another abstract protocol.

5. The method of claim 3, wherein the second protocol is an interface.

6. The method of claim 5, wherein the second protocol is a web services interface.

7. The method of claim 5, wherein the second protocol is a common language runtime interface.

8. The method of claim 3, wherein the second protocol is a business process execution language for web services.

9. The method of claim 1, wherein the first protocol is a web services business activity protocol and the second protocol is a business process execution language for web services.

10. A protocol mapping system, wherein a protocol is a structured communication pattern, comprising an input device that receives a first protocol, and a processor that receives the first protocol from the input device, generates a mapping interface to a second protocol, wherein the mapping interface comprises a coordination map, and generates a state diagram based on the first protocol, and partially maps the first protocol to the second protocol based on the mapping interface, thereby creating a new protocol, wherein the first protocol is an abstract protocol defining abstract operations and the new protocol comprises a protocol having (a) concrete characteristics, which bind one or more of the abstract operations to a first concrete (executable) process, and (b) abstract characteristics, which permit subsequent customizable binding of one or more of the abstract operations to a plurality of other concrete processes.

11. The system of claim 10, wherein the processor is adapted to map roles, transitions, and messages between the first protocol and the second protocol.

12. The system of claim 10, wherein the first protocol is a high-level protocol.

13. The system of claim 12, wherein the second protocol comprises another abstract protocol.

14. The system of claim 12, wherein the second protocol is an interface.

15. The system of claim 14, wherein the second protocol is a web services interface.

16. The system of claim 14, wherein the second protocol is a common language runtime interface.

17. The system of claim 12, wherein the second protocol is a business process execution language for web services.

18. The system of claim 10, wherein the first protocol is a web services business activity protocol and the second protocol is a business process execution language for web services.

19. A computer-readable storage medium having stored thereon a data structure for implementing the method of claim 1, the data structure comprising:

a first data field containing a state diagram for a first protocol, wherein a protocol is a structured communication pattern; and a second data field containing a coordination map between the first protocol and a second protocol, wherein the first protocol is an abstract protocol defining abstract operations and the coordination map is configured to generate a new protocol comprising (a) concrete characteristics, which bind one or more of the abstract operations to a first concrete (executable) process, and (b) abstract characteristics, which permit subsequent customizable binding of one or more of the abstract operations to a plurality of other concrete processes.

20. The computer-readable storage medium of claim 19, wherein the first protocol is a high-level protocol.

21. The computer-readable storage medium of claim 20, wherein the second protocol comprises another abstract protocol.

22. The computer-readable storage medium of claim 20, wherein the second protocol is an interface.

23. The computer-readable storage medium of claim 22, wherein the second protocol is a web services interface.

24. The computer-readable storage medium of claim 22, wherein the second protocol is a common language runtime interface.

25. The computer-readable storage medium of claim 20, wherein the second protocol is a business process execution language for web services.

26. The computer-readable storage medium of claim 19, wherein the first protocol is a web services business activity protocol and the second protocol is a business process execution language for web services.

* * * * *